United States Patent [19]

Brown et al.

[11] Patent Number: 4,788,251

[45] Date of Patent: Nov. 29, 1988

[54] POLYESTER-POLYCARBONATE COMPOSITIONS WITH FAVORABLE MELT VISCOSITY PROPERTIES

[75] Inventors: Sterling B. Brown, Schenectady, N.Y.; James L. DeRudder, Mt. Vernon, Ind.

[73] Assignee: General Electric Company, Schenectady, N.Y.

[21] Appl. No.: 84,069

[22] Filed: Aug. 11, 1987

[51] Int. Cl.$^4$ ............................................. C08L 69/00
[52] U.S. Cl. ...................................... 525/67; 525/107; 525/146; 525/148; 525/438; 525/439; 525/902
[58] Field of Search ................. 525/67, 438, 463, 107, 525/146, 148, 439, 446, 902

[56] References Cited

U.S. PATENT DOCUMENTS 4,532,290 7/1985 Jaquiss et al. ...................... 524/417

FOREIGN PATENT DOCUMENTS 7596648 12/1973 Japan .
78106749 3/1977 Japan .
81116749 2/1980 Japan .

Primary Examiner—Theodore E. Pertilla
Attorney, Agent, or Firm—William H. Pittman; James C. Davis, Jr.; James Magee, Jr.

[57] ABSTRACT

Polyester-polycarbonate blends having increased melt viscosity, and useful in such applications as blow molding, profile extrusion and thermoforming, are prepared by incorporating at least one poly(O- or N-epoxyalkyl-substituted) cyclic amide, imide or imidate, preferably triglycidyl isocyanurate. They may also contain impact modifying polymers.

20 Claims, No Drawings

POLYESTER-POLYCARBONATE COMPOSITIONS WITH FAVORABLE MELT VISCOSITY PROPERTIES

This invention relates to improved compositions comprising polycarbonates and linear polyesters, and more particularly to such compositions which have excellent melt viscosity characteristics which make them suitable for various new uses.

Blends of linear polyesters and polycarbonates have become of significant commercial interest. They combine such favorable polyester characteristics as surface hardness, abrasion resistance, high gloss, low surface friction, chemical stability, solvent resistance and low permeability to gas with properties characteristic of polycarbonates, including high impact strength, favorable tensile characteristics and high heat distortion temperature under certain conditions.

This combination of properties makes the polyester-polycarbonate blends attractive candidates for such forming operations as blow molding, profile extrusion and thermoforming. One problem is the relatively low melt viscosities of such blends, as a result of which the formed articles do not adequately retain their shape immediately after forming and before they have cooled.

One method of increasing the melt viscosity of a linear polyester, described in U.S. Pat. No. 4,590,259, is to substantially increase its molecular weight. However, this can generally be achieved only with the use of specialized equipment.

Even if the polyester molecular weight is high, melt behavior often leaves something to be desired since it is essentially independent of shearing stresses imposed during forming. In the best situation, a resin suitable for blow molding, profile extrusion, thermoforming and the like will exhibit a non-Newtonian response, having a low viscosity under high shear conditions such as those encountered during extrusion and a high viscosity under conditions of low shear typical of a blow molded parison or a thermoformed article. High molecular weight polyesters under melt conditions have the disadvantage of being essentially Newtonian in their behavior.

The present invention provides compositions comprising linear polyesters and polycarbonates which have excellent melt viscosity properties for the above-described forming operations. They also possess the usual excellent property profiles characteristic of polyester-polycarbonate blends.

Accordingly, the present invention includes compositions comprising the following and any reaction products thereof:

(A) at least one linear polyester or copolyestercarbonate containing a measurable proportion of epoxide-reactive functional groups;

(B) at least one polycarbonate or copolyestercarbonate which is substantially inert to epoxy groups; and (C) at least one poly(O- or N-epoxyalkyl-substituted) cyclic amide, imide or imidate;

the proportion of component B being at least about 35% by weight of components A and B, and the proportion of component C employed being about 0.05–3.0 parts by weight per 100 parts of component A.

Component A in the compositions of this invention is at least one linear polyester or copolyestercarbonate. The ester units therein typically have the formula

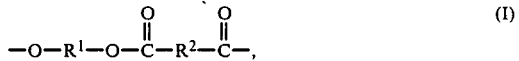

wherein each $R^1$ is independently a divalent aliphatic, alicyclic or aromatic radical and each $R^2$ is independently a divalent aliphatic, alicyclic or aromatic radical containing about 2–10 and usually about 6–10 carbon atoms. Polyesters containing such units may be prepared by the known reaction of dihydroxy compounds with dicarboxylic acids or functional derivatives thereof such as anhydrides, acid chlorides or lower alkyl (especially methyl) esters, preferably the esters.

The $R^1$ radicals may be one or more aliphatic or alicyclic hydrocarbon radicals, alicyclic radicals being known to those skilled in the art to be equivalent to aliphatic radicals for the purposes of the invention. They are most often derived from aliphatic or alicyclic dihydroxy compounds such as ethylene glycol, 1,4-butanediol, propylene glycol, 1,3-propanediol, 1,6-hexanediol, 1,10-decanediol, 1,4-cyclohexanedimethanol and 2-butene-1,4-diol. Aromatic dihydroxy compounds, especially bisphenols such as bisphenol A, may also be employed. The $R^1$ radicals may also contain substituents which do not substantially alter the reactivity of the dihydroxy compound (e.g., alkoxy, halo, nitrile) or hetero atoms (e.g., oxygen or sulfur). The aliphatic and alicyclic $R^1$ radicals are usually saturated.

The $R^2$ radicals may be derived from such acids as succinic, adipic, maleic, isophthalic and terephthalic acids or similar substituted and hetero atom-containing acids.

Also contemplated are polymers in which at least a portion of the $R^1$ and/or $R^2$ values are soft segment radicals such as poly(oxyethylene) or poly(oxybutylene). Such polymers may be prepared by incorporating compounds such as polyethylene glycol, caprolactone or dicarboxylic acids containing polyoxyalkylene segments in the polymerization reaction, and are typically elastomeric. Illustrative polyesters of this type are available from DuPont and General Electric under the trade names HYTREL and LOMOD, respectively.

Preferably, $R^1$ and $R^2$ are hydrocarbon radicals, typically containing about 2–10 and preferably 2–6 carbon atoms. Most often, $R^1$ is aliphatic and $R^2$ is aromatic. The polymer is most desirably a poly(alkylene terephthalate), particularly poly(ethylene terephthalate) ("PET") or poly(butylene terephthalate) ("PBT") and especially the latter. It usually has a number average molecular weight in the range of about 10,000–70,000, as determined by gel permeation chromatography or by intrinsic viscosity (IV) at 30° C. in a mixture of 60% (by weight) phenol and 40% 1,1,2,2-tetrachloroethane.

Copolyestercarbonates are also useful as component A. They contain, in addition to structural units of formula I, units of the formula

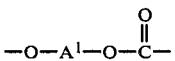

wherein $A^1$ is an aromatic radical. Suitable $A^1$ values include m-phenylene, p-phenylene, 4,4'-biphenylene, 2,2-bis(4-phenylene)propane, 2,2-bis(3,5-dimethyl-4-propane and similar radicals such as those which correspond to the dihydroxyaromatic compounds disclosed by name or formula (generic or specific) in U.S. Pat.

No. 4,217,438. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $A^1$ radicals are hydrocarbon radicals.

The $A^1$ radicals preferably have the formula

wherein each of $A^2$ and $A^3$ is a divalent monocyclic aromatic radical and Y is a bridging radical in which one or two atoms separate $A^2$ from $A^3$. The free valence bonds in formula III are usually in the meta or para positions of $A^2$ and $A^3$ in relation to Y. Such $A^1$ values may be considered as being derived from bisphenols of the formula $HO-A^2-Y-A^3OH$. Frequent reference to bisphenols will be made hereinafter, but it should be understood that $A^1$ values derived from suitable compounds other than bisphenols may be employed as appropriate.

In formula III, the $A^2$ and $A^3$ values may be unsubstituted phenylene or substituted derivatives thereof, illustrative substituents (one or more) being alkyl, halo (especially chloro and/or bromo), nitro, alkoxy and the like. Unsubstituted phenylene radicals are preferred. Both $A^2$ and $A^3$ are preferably p-phenylene, although both may be o-or m-phenylene or one o- or m-phenylene and the other p-phenylene.

The bridging radical, Y, is one in which one or two atoms, preferably one, separate $A^2$ from $A^3$. It is most often a hydrocarbon radical and particularly a saturated radical such as methylene, cyclohexylmethylene, 2-[2.2.1]bicycloheptylmethylene, ethylene, 2,2-propylene, 1,1-(2,2-dimethylpropylene),1,1-cyclohexylene, 1,1-cyclopentadelene, 1,1-cyclododecylene or 2,2-adamantylene, especially a gem-alkylene radical. Also included, however, are unsaturated radicals and radicals which are entirely or partially composed of atoms other than carbon and hydrogen. Examples of such radicals are 2,2-dichloroethylidene, carbonyl, thio and sulfone. For reasons of availability and particular suitability for the purposes of this invention, the preferred radical of formula II is the 2,2-bis(4-phenylene)propane radical, which is derived from bisphenol A and in which Y is isopropylidene and $A^2$ and $A^3$ are each p-phenylene.

Such copolyestercarbonates are typically obtained by the reaction of at least one dihydroxyaromatic compound with a mixture of phosgene and at least one dicarboxylic acid chloride, especially isophthaloyl chloride, terephthaloyl chloride or both.

For the purposes of this invention, it is essential that component A have a measurable proportion of free epoxy-reactive functional groups such as carboxylic acid, amine or isocyanate groups. These may be end groups or substituent groups on the polymer chain. By reason of the inherent production by normal preparation methods of carboxy end group-containing polyesters, such end groups are preferred; their concentration is readily conventionally measured in microequivalents per gram.

For the most part, a carboxylic acid group concentration in the range of about 5–250 microequivalents per gram is suitable. Polyesters may degrade to some extent on extrusion as described hereinafter, increasing the concentration of such end groups which is available for reaction. In general, however, it is preferred to employ as component A polymers having a carboxylic acid end group concentration in the range of about 10–100, especially about 30–100 and preferably about 40–80 microequivalents per gram.

Component B is at least one polycarbonate or copolyestercarbonate. Thus, it generally comprises structural units of formula II, optionally in combination with those of formula I. Unlike component A, however, component B is substantially inert to epoxy groups. That is, it does not contain carboxylic acid radicals or other radicals which will react with the epoxy groups in component C.

Both linear and branched polycarbonates are useful as component B. Branched polycarbonates are frequently preferred because they, like the branched polyesters present by reason of the reaction described hereinafter, have high melt viscosities. Such branched polycarbonates may be prepared, for example, by incorporating a minor proportion of a tricarboxylic acid chloride such as trimellitic acid trichloride in a bisphenol-phosgene reaction mixture from which the polycarbonate is formed.

At least one of components A and B is preferably other than a copolyestercarbonate. That is, either component A is a polyester without carbonate groups or component B is a polycarbonate without non-carbonate ester groups. It is frequently preferred for both to be true; that is, component A is a polyester and component B a polycarbonate, neither containing other types of structural units.

Component C is at least one poly(O- or N-epoxyalkyl-substituted) cyclic amide, imide or imidate, usually containing one non-epoxy cyclic moiety although compounds with linked or fused moieties are also contemplated. It is most often a compound in which the epoxyalkyl group is bonded directed to the oxygen or nitrogen atom; however, compounds containing intervening structure, such as 2-carboglycidyloxyethyl compounds, may also be used.

The essential requirement is the presence of more than one epoxy group per molecule. Three and only three of such groups are highly preferred, by reason of the ease of reaction of such compounds with carboxy-terminated polyesters to produce branched polyesters with a minimum of crosslinking and resulting gel formation. Such branched polyesters have optimum properties, especially with regard to melt viscosity. However, even compounds containing two epoxy groups are often suitable by reason of the production of hydroxy groups derived from the epoxide upon reaction with carboxylic acid moieties, said hydroxy groups being capable of later reaction with other such moieties to form branched structures.

Illustrative cyclic nuclei which may be present in component C are the triazine, barbiturate, hydantoin, uracil, pyromellitic diimide, piperazinedione and parabanate ring systems. As previously noted, the epoxy-containing functionalities may be present as substituents on oxygen or nitrogen atoms therein, with nitrogen atoms frequently being preferred. The most suitable compounds are triazine derivatives including triglycidyl cyanurate and triglycidyl isocyanurate (hereinafter "TGIC"). TGIC is particularly preferred by reason of its availability and particular suitability for the formation of branched polyesters. It has the formula

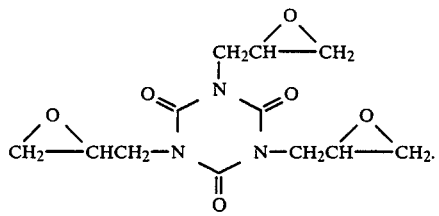

According to the present invention, component B comprises at least about 35%, most often about 35-95% and preferably about 50-80%, of the combination of components A and B. As explained hereinafter, the compositions of the invention may also contain other polymers (typically impact modifying polymers), and when that is the case, component B generally comprises at least about 40% by weight of total resinous components.

The proportion of component C is about 0.05-3.0 parts by weight per 100 parts of component A. At levels below 0.05 part, little effect on the melt viscosity of the composition is observed. On the other hand, as the concentration of component C is increased to about 1 part a precipitous rise in melt viscosity is noted. At 3 parts and above, the melt viscosity drops rapidly, reaching essentially the value of the original component A in the range of 5-7 parts and dropping even lower as the proportion of component C is further increased. About 0.1-0.5 part is usually preferred.

The compositions of this invention may be prepared by conventional blending methods. Melt blending methods are typically employed, frequently preceded by a dry blending step. A melt blending method which is often preferred is extrusion, ordinarily at temperatures in the range of about 200°-300° C.

TGIC and similar compounds are typically supplied as powders which may agglomerate into coarse particles. These particles are frequently difficult to mix uniformly with the other components during extrusion, and may result in regions of gel formation which produce flaw sites in formed articles. Moreover, many such compounds are irritants and/or health hazards. For example, TGIC has mutagenic properties. Contact with the body and inhalation should therefore be avoided as much as possible.

For this reason, it is frequently preferred to initially prepare a concentrate by blending a relatively large amount of component C with component A or B. Concentrates of this type may be prepared by melt blending or solution blending techniques as appropriate, and typically contain about 3-20 parts by weight of component C per 100 parts of component A or B.

The concentrates thus prepared are essentially indistinguishable in appearance and physical behavior from the resin used for their preparation. No obvious indicia of phase separation are observed therein. The concentrates are dust-free and may be handled with minimum skin contact within and inhalation of component C. They may be readily pelletized for easy handling. By the preparation of (for example) one batch of such a concentrate, continued or repeated handling of component C is made unnecessary.

The concentrate may be a reactive concentrate prepared by blending component C with a polyester containing carboxylic acid end groups, as disclosed and claimed in application Ser. No. 184,534 filed Apr. 21, 1988. Alternatively, it may involve the polycarbonate as disclosed and claimed in application Ser. No. 125,859, filed Nov. 27,1987. (Both of said applications are copending and commonly owned herewith.) The use of either type of concentrate is within the scope of the invention.

Various materials which are chemically substantially inert may be blended into the compositions prepared by the method of this invention. Such materials include fillers, reinforcing materials, flame retardants, pigments, dyes, stabilizers, anti-static agents and mold release agents. Also present may be other resinous materials, especially impact modifying polymers which are generally present in the amount of about 10-20% by weight of resinous components.

The impact modifiers that can be added to the instant compositions are well known in the art. Examples of these impact modifiers are:
polyacrylates;
polyolefins;
styrenic resins;
rubbery dienic polymers; and
organopolysiloxane-polycarbonate block copolymers.

The polyacrylates which may be employed as impact modifiers are rubbery homopolymers or copolymers. In general, the polyacrylates described in U.S. Pat. No. 3,581,659, which is incorporated herein by reference, can be used, especially those containing units derived from alkyl acrylates, particularly n-butyl acrylate. Acrylate containing copolymers wherein the other monomer is, for example, derived from a methacrylate are also employable, see, for example, Japanese Kokai No. 68/81611, incorporated herein by reference. Preferably the acrylate resin will be in the form of a rubber-elastic graft copolymer having a glass transition temperature below about −20° C., as per U.S. Pat. No. 4,022,748, incorporated herein by reference. More particularly, the acrylate resin will comprise a multiple stage polymer having a rubbery first stage (core) and a thermoplastic hard final stage (shell), see U.S. Pat. No. 4,096,202, incorporated herein by reference.

Typical core-shell polymers have a core comprising at least one of alkyl acrylate, diene and styrene units and a shell comprising alkyl methacrylate units. They are often preferably multi-phase composite interpolymers comprised of a $C_1-C_5$ acrylate and a $C_1-C_5$ methacrylate. These interpolymers consist of about 25 to 95 weight percent of a first elastomeric phase polymerized from a monomer system comprising about 77 to 99.8 weight percent of a $C_1-C_5$ alkyl acrylate, 0.1 to 5 weight percent of crosslinking monomer, 0.1 to 5 weight percent of graftlinking monomer, and about 75 to 5 weight percent of a final rigid thermoplastic phase polymerized in the presence of said elastomeric phase.

The crosslinking monomer is polyethylenically unsaturated monomer having a plurality of addition polymerizable reactive groups which all polymerize at substantially the same rate of reaction. Suitable crosslinking monomers include the polyacrylic and polymethacrylic esters of polyols such as butylene diacrylate and dimethacrylate, trimethylol propane trimethacrylate, and the like; di- and trivinyl benzene, vinyl acrylate and methacrylate, and the like. Preferred crosslinking monomer is butylene diacrylate.

The graftlinking monomer is polyethylenically unsaturated monomer having a plurality of addition polymerizable reactive groups, at least one of which polymerizes at substantially different rates of polymerization from at least one other of said reactive groups. The function of the graftlinking monomer is to provide a residual level of unsaturation in the elastomeric phase, particularly in the latter stages of polymerization and, consequently, at or near the surface of the elastomer particles.

When the rigid thermoplastic phase is subsequently polymerized at the surface of the elastomer, the residual unsaturated addition polymerizable reactive group contributed by the graftlinking monomer participates in the subsequent reaction so that at least a portion of the rigid phase is chemically attached to the surface of the elastomer. Among the effective graftlinking monomers are the allyl group containing monomers of alkyl esters of ethylenically unsaturated acids such as allyl acrylate, allyl methacrylate, diallyl maleate, diallyl fumarate and allyl acid itaconate. Somewhat less preferred are the diallyl esters of polycarboxylic acids which do not contain polymerizable unsaturation. The preferred graftlinking monomers are allyl methacrylate and diallyl maleate.

A most preferred interpolymer has only two stages, the first stage comprising about 60 to about 95 weight percent of the interpolymer and being polymerized from a monomer system comprising 95 to 99.8 percent by weight butyl acrylate, 0.2 to 1.5 weight percent butylene diacrylate as crosslinking agent, 0.1 to 2.5 percent by weight allyl methacrylate or diallyl maleate as a graftlinking agent, with a final stage polymerized from about 60 to 100 percent by weight methyl methacrylate.

Another quite useful acrylate based resin impact modifier is an acrylate-styrene-acrylonitrile resin, the so called ASA resin. Such resins are described in U.S. Pat. No. 3,944,631, incorporated herein by reference. Basically, this resin is comprised of from about 10 to about 50 weight percent of a crosslinked acrylate polymer having a Tg of less than 25° C., from about 5 to about 35 weight percent of a crosslinked styrene-acrylonitrile copolymer, and from about 15 to about 85 weight percent of a non-crosslinked or linear styrene-acrylonitrile copolymer. The composition is made by a three-step sequence comprising emulsion polymerizing of an alkyl (meth)acrylate containing at least one crosslinking monomer, emulsion polymerizing a monomer mixture of styrene, acrylonitrile and at least one crosslinking monomer in the presence of the crosslinked acrylate elastomer formed in the previous step, and finally emulsion polymerizing or suspension polymerizing of styrene and acrylonitrile in the presence of the previously formed product.

The acrylic elastomeric particles used in preparing these resins comprise crosslinked acrylic polymers or copolymers having a Tg of less than about 25° C. which can be polymerized by means of free radical initiated emulsion techniques. These acrylic elastomer particles are crosslinked so that they can retain their size and shape during subsequent polymer processing steps. This crosslinking is achieved during the polymerization of the elastomer by including a polyfunctional ethylenically unsaturated monomer in the polymerization reaction mixture.

Examples of acrylic elastomers that can be used include the crosslinked polymers of $C_2$–$C_{10}$ alkyl acrylate and $C_8$–$C_{22}$ alkyl methacrylate monomers, preferably the $C_4$–$C_8$ alkyl acrylates such as n-butyl acrylate, ethyl acrylate and 2-ethylhexyl acrylate. The most preferred acrylate is n-butyl acrylate. At least one acrylate monomer is used in this step. It is also possible to utilize mixtures of two or more different acrylate or methacrylate monomers, as well as mixtures of acrylate and methacrylate monomers. If desired, the monomer charge may optionally contain small amounts, i.e., 1–20% by weight of the amount of acrylate monomer, of such monomers as styrene, acrylonitrile, methacrylic acid, acrylic acid, vinylidene chloride, vinyltoluene and any other ethylenically unsaturated monomer copolymerizable with the (meth)acrylate monomer selected from use.

The polyolefins which can be employed as impact modifiers are the homopolymers and the copolymers. Preferred polyolefins are those which are derived from monomers containing from 2 to about 10 carbon atoms. Some illustrative non-limiting examples of these polyolefins include polyethylene, polypropylene, polybutylene, polyhexene, polyisobutylene and ethylenepropylene copolymer.

Methods for the preparation of the polyolefins are abundantly described in the literature and are well known to those skilled in the art. Polyethylene, for example, can be prepared by various procedures using cationic, anionic or free radical initiating catalysts, with conditions varied to produce a range of molecular weights and densities and various degrees of branching or non-branching. In one procedure, which involves free radical initiation, ethylene gas is polymerized in the presence of a peroxide initiating catalyst at a pressure between 15,000 and 40,000 psi and a temperature between 100° C. and 200° C. to produce a relatively low density polymer, i.e., 0.90 to 0.94 gm/cm$^3$.

The polyethylene can also be prepared by low pressure processes effective to attain a polymer of higher molecular weight and a higher density. In one such procedure, known as the Phillips process, ethylene is contacted in an inert solvent slurry of a catalyst such as chromium oxide supported on silica-aluminum, at pressures of 400 to 500 psi and temperatures of 130° C. to 170° C., followed by extraction of the polymer with hot solvent and purification, to produce a polyethylene product having a density between 0.96 to 0.97 gm/cm$^3$.

Still other procedures are possible, such as emulsion polymerization in aqueous media in the presence of a peroxy compound, as well as suspension polymerization at low temperatures using a silver salt-peroxide redox system.

Also employable as an impact modifier is polypropylene, a common commercial form of which is isotactic polypropylene. Such polymers can be prepared by anionically initiated reactions using Ziegler type catalysts, e.g., titanium halide such as $TiCl_3$ in combination with an organometallic co-catalyst such as trialkyl aluminum halide. Polymerization proceeds readily at temperatures between 25° C. and 100° C. to yield a polymer in the form of a slurry of insoluble granular powder.

Copolymers of ethylene and propylene can be prepared using procedures similar to those for polyethylene and other polyolefins; for instance, by the polymerization reaction of a mixture of ethylene and propylene in the presence of a Ziegler type catalyst or by free radical IO initiation under high pressures.

Polymers based on still higher olefins are not as readily available and, therefore, not as preferred. Examples of such higher polyolefins are polymers based on 2-methyl-1-butene, 1-pentene, 4-methyl-1-pentene, and the like. They can be prepared by known procedures including those described in *Encyclopedia of Polymer*

Science and Technology, John Wiley & Sons, Inc., Vol. 9, pp. 440-460, 1965, incorporated herein by reference.

The linear low density polyolefins, such as linear low density polyethylene, may be prepared by state of the art polymerization processes such as those described in U.S. Pat. No. 4,076,698, incorporated herein by reference. The polymers may have a density between 0.89 and 0.96 gm/cc and a controlled concentration of simple side branching as opposed to random branching which distinguishes them from polymers such as high pressure low density polyethylene and high density polyethylene. The preferred range of density is from 0.915 to about 0.945 gm/cc. The linear low density polyethylenes are made from ethylene and alpha-olefins of 3 to 8 carbon atoms, e.g., butene-1, octene-1, etc., or mixtures thereof. The comonomer is generally used in minor amounts, e.g., 10 mole % or less of the total amount of monomers. A preferred range is about 1-3 mole %. A particularly useful copolymer is made from ethylene and butene such as, for example, ESCORENE LPX-15 marketed by Exxon Chemical Company.

Some particularly useful linear low density polyethylenes are those made from ethylene and a $C_4$-$C_7$ alpha-olefin as comonomer. Such linear low density polyethylenes, as well as their use as impact modifiers in polycarbonate resins, are described in U.S. Pat. No. 4,563,501, incorporated herein by reference.

Olefin-containing copolymers such as olefin acrylates and olefin diene terpolymers can also be used as impact modifiers in the present compositions. An example of an olefin acrylate copolymer impact modifier is ethylene ethylacrylate copolymer available from Union Carbide as DPD-6169. Other higher olefin monomers can be employed as copolymers with alkyl acrylates, for example, propylene and n-butyl acrylate. The olefin diene terpolymers are well known in the art and generally fall into the EPDM (ethylene propylene diene) family of terpolymers. They are commercially available such as, for example, EPSYN 704 from Copolymer Rubber Company. They are more fully described in U.S. Pat. No. 4,559,388, incorporated herein by reference.

Various rubber polymers can also be employed as impact modifiers. Examples of such rubbery polymers are polybutadiene, polyisoprene, styrene-butadiene, and various other polymers or copolymers having a rubbery dienic monomer.

Styrene-containing polymers can also be employed as impact modifiers. Examples of such polymers are acrylonitrile-butadiene-styrene, styrene-acrylonitrile, acrylonitrile-butadiene-alpha-methylstyrene, methacrylate-butadiene-styrene, and other high impact styrene-containing polymers such as, for example, high impact polystyrene. Other known impact modifiers include various elastomeric materials such as organic silicone rubbers, elastomeric fluorohydrocarbons, elastomeric polyesters, the random block polysiloxane-polycarbonate copolymers, and the like. The preferred organopolysiloxane-polycarbonate block copolymers are the dimethylsiloxane-polycarbonate block copolymers.

In the following examples illustrating the invention, the blend constituents used were as follows:

PBT—a poly(butylene terephthalate) having a number average molecular weight, as determined by gel permeation chromatography, of about 50,000.

PET—a poly(ethylene terephthalate) obtained from bottle scrap.

PC—a branched bisphenol A polycarbonate prepared interfacially with the incorporation of 0.4 mole percent trimellitic acid trichloride, based on bisphenol, and having a weight average molecular weight of about 68,000.

PE-PC—a copolyestercarbonate containing 78 mole percent polyester and 22 mole percent polycarbonate units and having a weight average molecular weight of about 50,000, prepared by the interfacial reaction of bisphenol A with phosgene and a 93:7 (by weight) mixture of isophthaloyl and terephthaloyl chloride.

IM-1—a commercially available (from Rohm & Haas) stabilized core-shell polymer containing a poly(styrene-butadiene) core and a poly(methyl methacrylate) shell.

IM-2—a commercially available (from Rohm & Haas) core-shell polymer containing a poly($C_{1-5}$ alkyl acrylate) core and a poly(methyl methacrylate) shell.

Stabilizers—various commercially available antioxidants and similar stabilizin ingredients.

All ingredient proportions in the examples are by weight.

EXAMPLES 1-3

Resin blends were prepared by dry mixing in a tumble blender for 5-10 minutes followed by extrusion at 245°-260° C. using a single screw extruder. The blends contained 35.75% PBT, 15% IM-1, 1.25% stabilizers and proportions of TGIC, with the balance being PC. Melt viscosity, notched Izod impact strength, tensile properties and flextural properties were determined using standard ASTM procedures. The results are given in Table I, in comparison with a control which was identical except that it contained no TGIC.

TABLE I

| | Example | | | Control |
|---|---|---|---|---|
| | 1 | 2 | 3 | |
| TGIC, % | 0.10 | 0.25 | 0.40 | — |
| Melt viscosity (266° C.), poises × $10^2$ | 429 | 734 | 1352 | 312 |
| Izod impact strength (−30° C.), joules/m. | 582.1 | 592.7 | 624.8 | 582.1 |
| Tensile strength, MPa. | 53.8 | 55.2 | 56.3 | 50.8 |
| Tensile elongation, % | 132 | 127 | 112 | 122 |
| Flexural strength, MPa. | 73.8 | 74.7 | 82.0 | 73.8 |
| Flexural modulus, GPa. | 1.96 | 2.01 | 2.15 | 1.97 |

The products were extruded into blow-molding parisons under conventional conditions, using a 25.4×43.2 cm. plaque tool. The parisons were clamped at both ends and preformed with low air pressure. The mold was then closed against the parison which was formed using high air pressure.

It was noted that melt strength, as evidenced by resistance to sagging in the hanging parison, increased with an increase in TGIC content (i.e., from Example 1 to Example 3). Example 3 demonstrated the optimum combination of low extrusion pressure and high melt strength.

EXAMPLES 4-6

Resin blends were prepared by dry mixing in a tumble blender for 5-10 minutes followed by extrusion at 288° C. They contained 20.90% PET, 2% PC, 15% IM-2, 0.5% stabilizers and varying quantities of TGIC, with the balance being PE-PC. The relevant parameters and properties are given in Table II.

TABLE II

|  | Example 4 | Example 5 | Example 6 | Control |
| --- | --- | --- | --- | --- |
| TGIC, % | 0.10 | 0.25 | 0.40 | — |
| Melt viscosity (266° C.), poises × $10^2$ | 1091 | 2187 | 2437 | 658 |
| Izod impact strength (room temp.), joules/m. | 560.7 | 560.7 | 582.1 | 614.1 |
| Tensile strength, MPa. | 53.6 | 56.1 | 52.5 | 59.2 |
| Tensile elongation, % | 87 | 89 | 74 | 106 |
| Flexural strength, MPa. | 82.0 | 79.3 | 82.0 | 78.6 |
| Flexural modulus, GPa. | 1.90 | 1.89 | 1.93 | 1.85 |

The products were extruded into parisons and blow-molded as described for Examples 1–3. Example 4 demonstrated the optimum combination of properties.

EXAMPLES 7–8

Resin blends similar to those of Examples 1–3 were prepared, employing a PBT-TGIC concentrate comprising 3.5% TGIC. The blends contained 48% PC, 15% IM-1, 1.25% stabilizers and an amount of concentrate to provide the stated proportion of TGIC. The relevant parameters and properties are given in Table III.

TABLE III

|  | Example 7 | Example 8 |
| --- | --- | --- |
| TGIC, % | 0.30 | 0.40 |
| Melt viscosity (266° C.), poises × $10^2$ | 896 | 965 |
| Izod impact strength (−30° C.), joules/m. | 555.4 | 582.1 |
| Tensile strength, MPa. | 48.8 | 49.5 |
| Tensile elongation, % | 122 | 102 |
| Flexural strength, MPa. | 78.2 | 81.3 |
| Flexural modulus, GPa. | 1.98 | 2.08 |

What is claimed is:

1. A composition comprising the following and any reaction products thereof:
    (A) at least one linear polyester or copolyestercarbonate containing a measurable proportion of epoxide-reactive functional groups;
    (B) at least one polycarbonate or copolyestercarbonate which is substantially inert to epoxy groups; and
    (C) at least one poly(O- or N-epoxyalkyl-substituted) cyclic amide, imide or imidate;
    the proportion of component B being at least about 35% by weight of components A and B, and the proportion of component C employed being about 0.05–3.0 parts by weight per 100 parts of component A.

2. A composition according to claim 1 wherein reagent C contains a single triazine, barbiturate, hydantoin, uracil, pyromellitic diimide, piperazinedione or parabanate moiety and the epoxyalkyl groups therein are bonded directly to oxygen or nitrogen atoms.

3. A composition according to claim 2 wherein component A is a linear polyester comprising structural units of the formula $$-O-R^1-O-\overset{O}{\underset{\|}{C}}-R^2-\overset{O}{\underset{\|}{C}}-, \qquad (I)$$

wherein each $R^1$ is independently a divalent aliphatic, alicyclic or aromatic radical and $R^2$ is a divalent aliphatic, alicyclic or aromatic radical containing about 2–10 carbon atoms, and the epoxide-reactive groups are carboxylic acid end groups.

4. A composition according to claim 3 wherein component B is a copolyestercarbonate.

5. A composition according to claim 3 wherein component B is a homopolycarbonate comprising structural units of the formula $$-O-A^1-O-\overset{O}{\underset{\|}{C}}-, \qquad (II)$$

wherein $A^1$ is an aromatic radical.

6. A composition according to claim 5 wherein component A is a poly(ethylene terephthalate) or poly(butylene terephthalate) having a free carboxylic acid end group concentration in the range of about 5–250 microequivalents per gram.

7. A composition according to claim 6 wherein $A^1$ has the formula $$-A^2-Y-A^3- \qquad (III),$$

wherein each of $A^2$ and $A^3$ is a divalent monocyclic aromatic radical and Y is a bridging radical in which one or two atoms separate $A^2$ from $A^3$.

8. A composition according to claim 7 wherein component C is triglycidyl isocyanurate.

9. A composition according to claim 7 wherein reagent B is a bisphenol A polycarbonate.

10. A composition according to claim 9 wherein component B comprises about 50–80% of the combination of components A and B.

11. A composition according to claim 10 wherein component A is poly(butylene terephthalate).

12. A composition according to claim 11 wherein component A has a free carboxylic acid end group concentration in the range of about 40–80 microequivalents per gram.

13. A composition according to claim 12 wherein component C is triglycidyl isocyanurate.

14. A composition according to claim 7 which also contains an impact modifying polymer selected from the group consisting of polyacrylates, polyolefins, styrenic resins, rubbery dienic polymers and organopolysiloxane-poly-carbonate block copolymers.

15. A composition according to claim 14 wherein component C is triglycidyl isocyanurate.

16. A composition according to claim 15 wherein component B comprises about 50–80% of the combination of components A and B and at least about 40% by weight of total resinous components.

17. A composition according to claim 16 wherein component A is poly(butylene terephthalate).

18. A composition according to claim 17 wherein component A has a free carboxylic acid end group concentration in the range of about 40–80% microequivalents per gram.

19. A composition according to claim 18 wherein the impact modifying polymer is a core-shell polymer having a core comprising at least one of alkyl acrylate, diene and styrene units and a shell comprising alkyl methacrylate units and is present in the amount of about 10–20% by weight of resinous components.

20. A composition according to claim 19 wherein reagent B is a bisphenol A polycarbonate.

* * * * *